2,290,938

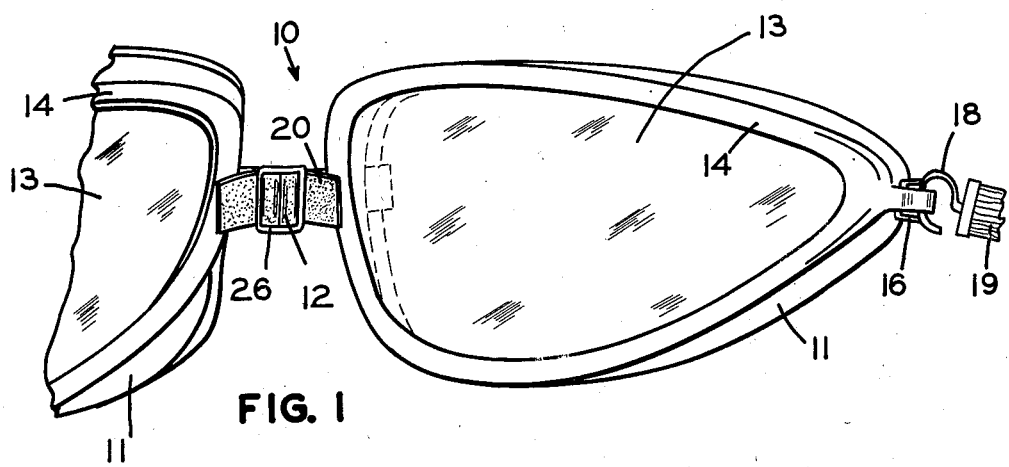
FIG. 1
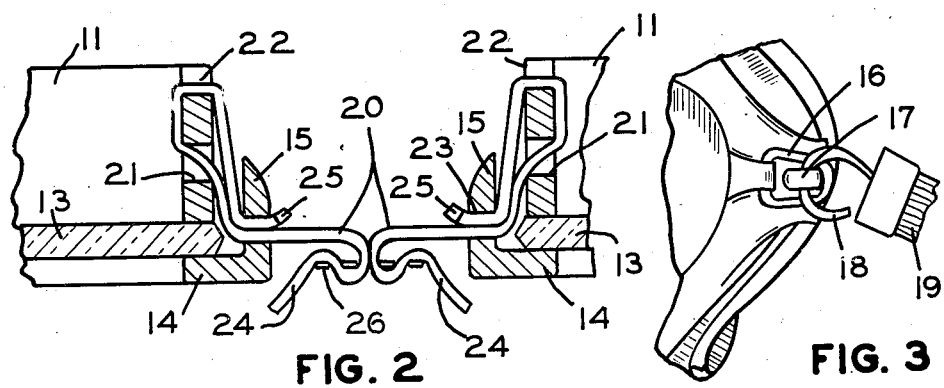 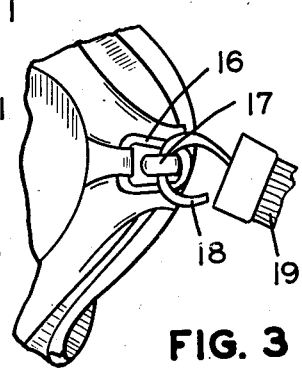
FIG. 2   FIG. 3
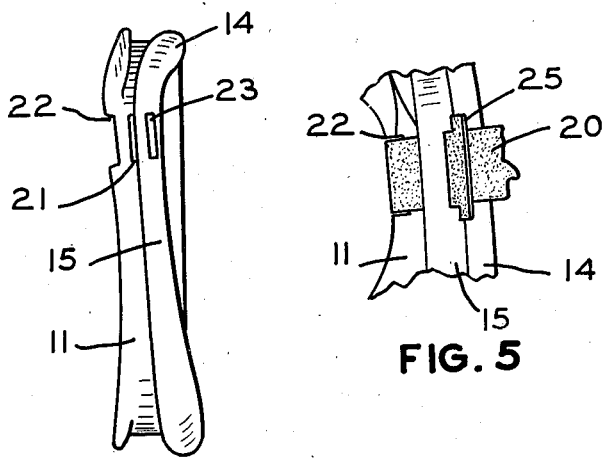 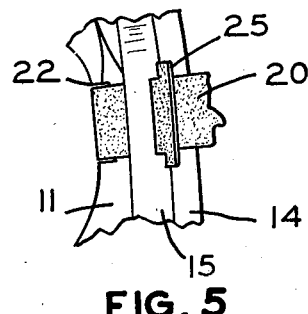
FIG. 4   FIG. 5
SAMUEL E. BOUCHARD
INVENTOR Patented July 28, 1942

UNITED STATES PATENT OFFICE 2,290,938

GOGGLE

Samuel E. Bouchard, Brighton, N. Y., assignor to Bausch & Lomb Optical Company, Rochester, N. Y., a corporation of New York Application December 22, 1941, Serial No. 423,929

3 Claims. (Cl. 2—14)

This invention relates to goggles and more particularly it has reference to the bridge member which connects the two eyecups.

One of the objects of my invention is to provide an improved bridge member for a goggle. Another object is to provide a goggle having a relatively simple, yet efficient, flexible bridge member which can be readily assembled and adjusted. A further object is to provide a goggle having an improved bridge member which also acts as a retainer for the bezel of the eyecup. These and other objects and advantages reside in certain novel features of construction, arrangement and combination of parts as will hereinafter be more fully explained and pointed out in the appended claims.

Referring to the drawing:

Fig. 1 is a fragmentary front view of a goggle embodying my invention.

Fig. 2 is a horizontal sectional view showing the bridge connection with the eyecups.

Fig. 3 is a fragmentary side view of the eyecup.

Fig. 4 is a view of the nasal side of the eyecup and bezel.

Fig. 5 is a fragmentary view of the bridge member.

A preferred embodiment of my invention is shown in the drawing wherein 10 indicates, generally, a goggle having the two spaced eyecups 11 connected by the bridge means 12. A lens 13, formed of any suitable material such as glass or plastics, is positioned on the front edge of each eyecup and held in place by a bezel 14 having the overhanging lip or sidewall 15. The construction of both eyecups is identical, as is customary in the art. At its temporal end the bezel 15 is detachably secured to the eyecup 11 by means of a pivotally mounted latch 16 which engages an upstanding lug 17 formed on the eyecup 11. Accidental removal of the latch 16 is prevented by the ring 18 which is secured to the end of the head band 19. The ring 18 passes through an opening (not shown) in the lug 17 so that the bezel is detachably held on the eyecup at its temporal end.

The nasal side of the bezel 14 is detachably secured to the eyecup by the bridge means 12 which comprises a flexible member such as the leather strap 20. The nasal wall of eyecup 11 has a slot 21 therein which is substantially in alignment with a notch 22 formed in the rear edge of the cup and the slot 23 formed in the nasal wall of the bezel 14. As clearly shown in Fig. 2, the strap 20 extends from a point adjacent the outer nasal side of the bezel 14, through the slot 23, thence through the notch 22 and into the eyecup, thence through the slot 21 and out through the slot 23 again and terminating in a free end portion 24. The other end of the strap 20 has an enlarged portion 25 which prevents the end from passing through slot 23. The end portions 24 of each strap 20 are adjustably connected by threading them through a slotted buckle 26 so that the distance between the eyecups may be varied.

From the foregoing it will be apparent that I am able to attain the objects of my invention and provide an improved type of bridge connection for a goggle. The eyecups and bezels may be formed of any suitable material such as a plastic and the slots and the notch can be formed during the molding of the parts. The lenses can be readily removed and the distance between the eyecups can be easily adjusted without the use of tools. Various modifications can be made without departing from the spirit of my invention.

I claim:

1. In a goggle the combination of an eyecup having a slot in its nasal wall and a notch in the rear edge of the wall in alignment with the slot, a lens on the eyecup, a bezel for holding the lens on the eyecup, said bezel having a slot in its nasal wall which is substantially in alignment with the slot in the eyecup, and a bridge comprising a flexible strap member which extends through the slot in the bezel, thence through the notch to the inside of the eyecup, thence through the slot in the eyecup and out through the slot in the bezel.

2. A goggle comprising a pair of spaced eyecups, a lens mounted on each eyecup, a bezel for holding each lens on its eyecup, each eyecup having a slot in its nasal wall and a notch in the rear edge of the wall in alignment with the slot, each bezel having a slot in its nasal wall, and a bridge comprising a flexible strap member secured to each eyecup, each of said members extending through the slot in its respective bezel, through the notch, thence through the slot in the eyecup and out through the slot in the bezel and terminating in a free end, means for connecting the free ends of the two strap members, the other end of each strap member having an enlargement which keeps the end from passing through the slot in the bezel.

3. In a goggle the combination of an eyecup having a slot in its nasal wall and a notch in the rear edge of said wall, a lens on the eyecup and a bezel for holding the lens in position, said bezel having a slot in its nasal wall and a bridge comprising a flexible strap member which extends from the outer wall of the bezel through the slot therein, thence through the notch and into the eyecup and out through the slot in the eyecup and thence through the slot in the bezel and terminating in a free end, the other end of the strap member having an enlargement which prevents it from passing through the slot in the bezel.

SAMUEL E. BOUCHARD.